US005638112A

United States Patent [19]
Bestler et al.

[11] Patent Number: 5,638,112
[45] Date of Patent: Jun. 10, 1997

[54] HYBRID ANALOG/DIGITAL STB

[75] Inventors: Caitlin B. Bestler, Lisle; Khosro M. Rabii, Hawthorn Woods, both of Ill.

[73] Assignee: Zenith Electronics Corp., Glenview, Ill.

[21] Appl. No.: 511,336

[22] Filed: Aug. 7, 1995

[51] Int. Cl.$^6$ ................................ H04N 7/16; H04N 5/60
[52] U.S. Cl. ............................ 348/10; 348/584; 348/738; 455/6.3; 381/119
[58] Field of Search ........................ 348/7, 10, 12, 348/11, 484, 584, 585, 589, 598, 600, 726, 731, 738; 455/4.2, 6.1, 6.2, 6.3, 137; 381/119, 123; H04N 7/16, 5/60

[56] References Cited

U.S. PATENT DOCUMENTS

| | | |
|---|---|---|
| 4,970,595 | 11/1990 | Bloomfield ........................... 348/584 |
| 5,014,341 | 5/1991 | Bittel ................................... 455/6.3 |
| 5,253,275 | 10/1993 | Yurt et al. ............................ 348/7 |
| 5,450,392 | 9/1995 | Walfrich .............................. 455/6.1 |
| 5,479,202 | 12/1995 | Beriont ............................... 348/10 |
| 5,534,942 | 7/1996 | Beyers, Jr. et al. ................ 348/584 |

Primary Examiner—John K. Peng
Assistant Examiner—Jeffrey S. Murrell

[57] ABSTRACT

A hybrid analog/digital STB includes a tuner supplying respective analog and digital television signal processing paths. The analog processing path provides demodulated composite analog video and audio signals and the digital processing path provides demodulated component digital video and audio signals. The demodulated analog and video signals are combined in composite or component form to achieve various desirable effects in a highly flexible system architecture. OSD and display map normalization functions are also integrated within the system architecture.

12 Claims, 1 Drawing Sheet

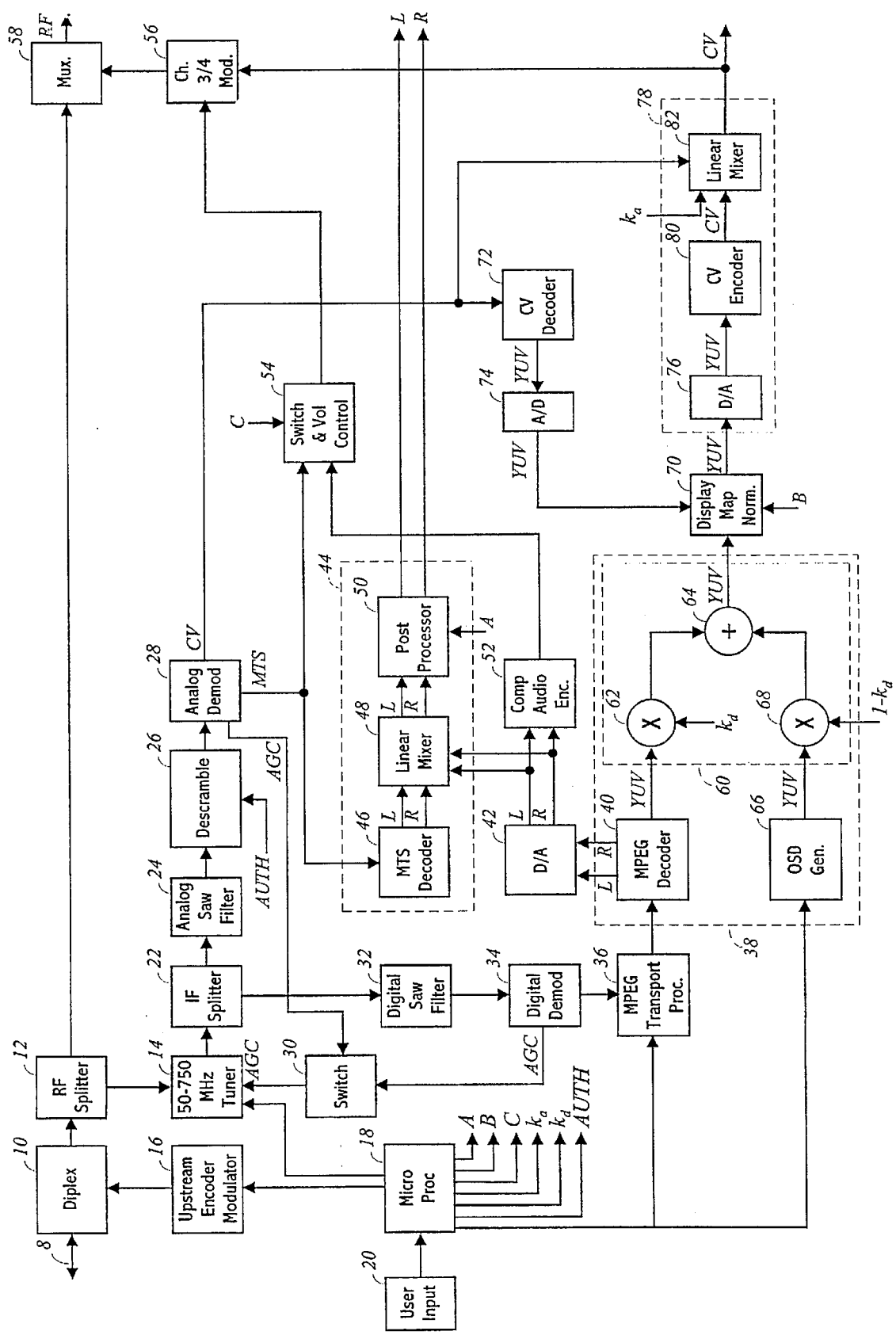

HYBRID ANALOG/DIGITAL STB

BACKGROUND OF THE INVENTION

The present invention generally relates to subscriber set-top boxes (STB) and more particularly concerns subscriber STB's capable of receiving and processing both analog and digital television signals.

Analog STB's (i.e. STB's capable of receiving and processing analog television signals) have been in use in cable systems for many years. Great strides have recently been made in new technology for transmitting and receiving digital television signals. For example, high speed modems employing digital VSB technology have been demonstrated for both terrestial and cable use and IC's are now available for compressing and packetizing video signals according to the MPEG standard. Digital audio compression IC's are also available using, for example, Dolby technology. Complementary IC's for decompressing and depacketizing the received signal are likewise now available.

Using this new digital technology, it is possible to transmit a number of video programs (e.g. 2-10 based on content) or other digital data on a single 6 MHz cable television channel. While cable operators and other information providers are very interested in the expanded data capacity that this technology provides, this interest has been somewhat tempered by the relative unavailability of programming in the digital format relative to that available in analog form, the relatively high cost of the digital technology and compatibility concerns with the large base of installed analog STB's. A proposed solution to the programming availability and compatibility issues is the use of a hybrid STB capable of receiving and processing both analog and digital television signals. The high cost of the digital technology, however, still remains a problem, as does the matter of efficiently integrating the analog and digital processing functions in the hybrid STB. It is therefore a basic object of the present invention to provide an improved architecture for a hybrid analog/digital STB and, in particular, an improved architecture which allows for efficient yet flexible integration of the analog and digital processing functions of the STB which facilitate cost reductions in the manufacture thereof.

BRIEF DESCRIPTION OF THE DRAWING

These and other objects and advantages of the invention will be apparent upon reading drawings in which the sole FIGURE is a block diagram showing a presently preferred embodiment of the invention.

DESCRIPTION OF THE PREFERRED EMBODIMENT

The hybrid analog/digital STB of the invention is shown in the FIGURE. A plurality of analog and digital television signals are received from a transmission medium represented by double ended arrow 8 at a diplexer 10 and applied through an RF splitter 12 to a tuner 14. The transmission medium may comprise, for example, a cable (or hybrid fiber coaxial) plant, an MMDS distribution system or the like. The analog television signals may be encoded in standard NTSC form while the digital television signals may be compressed in accordance with MPEG and Dolby standards and transmitted using VSB or QAM modulation. Signals from an upstream encoder and modulator 16 are coupled to diplexer 10 for upstream transmission to the cable headend. Data for upstream transmission is applied to unit 16 by a microprocessor 18, which is controlled by a user input device 20 such as an on-board keyboard or a remote control transmitter.

Microprocessor 18 also controls tuner 14 for tuning a selected channel, which may comprise either an analog television channel or a digital television channel. The IF output of tuner 14 representing the tuned analog or digital television signal is applied through an IF splitter 22 to an analog processing path and a digital processing path. The analog processing path includes an NTSC SAW IF filter 24, a descrambler 26 controlled by an output AUTH of microprocessor 18 for selectively descrambling the received analog television signal and an NTSC demodulator 28 which provides baseband composite video and audio outputs. Demodulator 28 also generates a DC AGC signal which is applied to one input of a switch 30 for application to tuner 14. If baseband scrambling is used, a baseband descrambler would be provided at the output of demodulator 28 instead of IF descrambler 26.

The digital channel includes a digital IF SAW filter 32 which supplies a digital demodulator 34. Demodulator 34, which also generates a DC AGC signal for application to tuner 14 through switch 30, may, for example, comprise a VSB or QAM demodulator depending on the type of digital modulation used on the channel. The AGC action of tuner 14 may be normalized to the range of the DC AGC signal from analog demodulator 28. If the range of the DC AGC signal from digital demodulator 34 is significantly different from this former range, switch 30 may comprise circuitry for converting the range of the digital DC AGC signal to a range compatible with the AGC operation of the tuner. The demodulated digital television signal from demodulator 34 is applied to an MPEG transport demultiplexer 36 which is controlled by microprocessor 18 for providing an output bitstream representing a selected program (or other data) multiplexed within the demodulated signal. The demultiplexed bitstream is then applied to an IC 38 which includes an MPEG decoder 40. MPEG decoder 40, which preferably includes 1-8M of RAM, decompresses the applied bitstream to develop a decompressed digital video signal in YUV component form and a decompressed digital audio signal in L and R component form.

The decompressed L and R digital component audio signals from MPEG decoder 40 of IC 38 are converted to corresponding analog component signals by a pair of D/A converters 42 and applied to an analog MTS decoder IC 44. IC 44 comprises an MTS decoder 46, a linear mixer 48 (which may be operated as a switch) and a post processor 50. In accordance with conventional application of IC 44, the composite analog audio output of analog demodulator 28 is applied to MTS decoder 46 which provides corresponding analog L and R component outputs to mixer 48. The other two inputs to mixer 48 are normally supplied from jacks on the back of the receiver. However, according to the invention, these inputs are instead supplied with the analog L and R component outputs of D/A converter 42. Thus, if an analog television signal is tuned, the corresponding L and R component audio signals will be provided by decoder 46 to mixer 48 and if a digital television signal is tuned the L and R component audio signals from D/A converter 42 will be provided to mixer 48. In either case, the L and R analog component audio outputs of the mixer are processed by post processor 50 (to adjust volume, base, treble, balance, etc. in response to a control signal A from microprocessor 18) and provided thereby as respective L and R outputs of the STB for application to a suitable sound reproduction system. If both are present, linear mixer 48 may be operated for linearly mixing selected proportions of the L and R component audio signals provided by the respective analog and digital processing paths under the control of microprocessor 18. Thus, for example, the audio signal from the digital processing path may be used as a low level background enhancement to the primary audio signal derived from the analog processing path.

The analog L and R component audio signals from D/A converter 42 are also combined in a composite audio encoder 52 to provide a composite stereo audio output signal, which is applied to one input of a switch and volume control circuit 54. To reduce costs, audio encoder 52 may alternatively comprise a summer for combining the L and R audio signals from D/A converter 42 to provide a monaural audio signal L+R for application to switch and volume control 54. The other input of circuit 54 is supplied with the analog MTS composite audio signal from demodulator 28. Circuit 54, which is controlled by a signal C from microprocessor 18, appropriately adjusts the volume of one of the input signals and couples it to one input of a channel 3/4 modulator 56. The other input of modulator 56 is supplied with a processed baseband composite video signal, which is suitably combined with the applied audio signal to provide an NTSC channel 3/4 RF output signal. This RF signal is applied to one input of a multiplexer 58 which receives at its second input the other output of RF splitter 12. Multiplexer 58 preferably comprises a filter for creating a notch corresponding to at least one 6 MHz television channel in the RF spectrum from splitter 12 and a circuit for inserting the output of channel 3/4 modulator 56 in this notch. Alternatively, multiplexer 58 may comprise a simple NB switch for providing as an output either the RF signal from splitter 12 or the channel 3/4 signal from modulator 56.

Returning to IC 38, in addition to MPEG decoder 40, the IC comprises an on-screen display (OSD) generator 66 and a pair of multipliers 62 and 68 which together with a mixer 64 comprise a digital mixer 60. The digital YUV component output of MPEG decoder 40 is applied to first multiplier 62 of digital mixer 60 where it is multiplied by a programmable value Kd (supplied by microprocessor 18) and then supplied to one input of mixer 64. OSD generator 66 responsive to microprocessor 18 supplies a second digital YUV component signal to second multiplier 68 of digital mixer 60 where it is multiplied by the value (1−Kd) and supplied to a second input of mixer 64. The output of mixer 64 (which comprises the output of digital mixer 60 and IC 38) therefore comprises a digital video YUV component signal representing a programmable mixture of the output of MPEG decoder 40 and the output of OSD generator 66, which mixture may be varied in a complementary relationship under the control of microprocessor 18. Thus, for example, by appropriately adjusting the value of Kd, the output of mixer 64 can be made to represent a series of text and graphics from OSD generator 66 which forms an overlay that continuously fades into and out of the video from decoder 40. It will also be appreciated that digital mixer 60 can be operated as a switch for coupling only the output of MPEG decoder 40 (by making $K_d$ large) or only the output of OSD generator 66 (by making $K_d$=0). As will be explained in further detail hereinafter, the output of MPEG decoder 40 may also represent one or more downloaded frames of video for mixing with a received analog television signal.

The output of IC 38, i.e. the digital YUV component output of mixer 64, is applied to one input of a display map normalizer 70. The composite video signal from analog demodulator 28 is converted to corresponding analog YUV component form by a composite video decoder 72, which YUV component signals are then converted to digital form by an A/D converter 74 for application to a second input of normalizer 70. Normalizer 70 may comprise a scan converter for converting either or both (in which case it would include a digital mixer) the received analog or digital television signal to a desired display format. This may be done to increase the perceived resolution of the displayed signal or to convert from a non-standard to standard display format (especially in the digital channel). Scan converters for performing this function are well known in the art. In a preferred embodiment of the invention, normalizer 70 is operable for providing a digital component YUV video signal in a format corresponding to the CCIR 601 standard.

The digital YUV output of display map normalizer 70 (representing the television signal received either over the analog or digital processing path or a mixture of both) is applied to a D/A converter 76 of a third IC 78. The analog YUV component output of converter 76 is applied to an NTSC composite video encoder 80 of IC 78 which generates a corresponding NTSC format analog composite video baseband output signal. This signal is applied to one input of a linear mixer 82 of IC 78 which receives at a second input the analog composite video signal from demodulator 28. Analog linear mixer 82 is controlled by a signal Ka from microprocessor 18 for complementarily combining the two composite video signals in a manner corresponding to the operation of digital linear mixer 60. The analog composite video output of mixer 82 forms the composite video input to modulator 56 and also comprises the composite video output of the STB. Linear mixer 82 may be used to provide, for example, a text and graphics overlay from either OSD generator 66 or a downloaded signal stored in RAM of MPEG decoder 40 on the composite video from demodulator 28.

What has thus been described is a novel architecture for a hybrid digital/analog STB. It is recognized that numerous changes in the described embodiment of the invention will be apparent to those skilled in the art without departing from its true spirit and scope. The invention is to be limited only as defined in the claims.

What is claimed is:

1. Apparatus for processing analog and digital television signals received over respective television channels, comprising:

a tuner (14) selectively operable for tuning said television channels;

an analog processing path (24–28) coupled to the output of said tuner (14) and responsive to a tuned analog television signal for providing a demodulated baseband analog television signal including a first analog composite video signal and a first analog composite audio signal;

a digital processing path (32–36, 40) coupled to the output of said tuner (14) and responsive to a tuned digital television signal for providing a demodulated digital television signal including a first digital component video signal and a first digital component audio signal;

means (76, 80) for converting the first digital component video signal to a corresponding second analog composite video signal; and first means (82) for linearly mixing said first and second analog composite video signals in selected proportions for providing an output analog composite video signal.

2. The apparatus of claim 1 including an OSD signal generator (66) for providing a digital OSD component video signal and second means (60) coupled between the digital processing path and the OSD generator on the one hand and the means for converting on the other hand for linearly mixing said first and OSD digital video component signals in selected proportions.

3. The apparatus of claim 2 wherein said first and second linear mixing means are both operable in a switch mode.

4. The apparatus of claim 2 wherein said second linear mixing means comprises a first multiplier (62) for multiplying said first digital component video signal by a programmable factor K, a second multiplier (68) for multiplying said digital OSD component video signal by the factor (1−K) and means (64) for combining the outputs of said first and second multipliers.

5. The apparatus of claim 2 including means (72, 74) for converting the first analog composite video signal to a corresponding second digital component video signal and display map normalization means (70) for coupling said first and/or second digital component video signals to said first digital component video signal converting means (76, 80).

6. The apparatus of claim 1 including means (46) for converting the first analog composite audio signal to a corresponding analog component audio signal, means (42) for converting the first digital component audio signal to a corresponding second analog component audio signal and third means (48) for linearly mixing said first and second analog component audio signals in selected proportions for providing an output analog component audio signal.

7. The apparatus of claim 6 including means for selectively adjusting a selected characteristic of said output analog component audio signal.

8. The apparatus of claim 7 wherein said third linear mixing means is operable in a switch mode.

9. The apparatus of claim 6 including means (52) for converting the second analog component audio signal to a corresponding second analog composite audio signal and switch means (54) for coupling a selected one of said first and second analog composite audio signal to an output terminal.

10. The apparatus of claim 9 wherein said means for converting said second analog component audio signal comprises a summer.

11. The apparatus of claim 9 wherein said means for converting said second analog component audio signal comprises a composite audio encoder.

12. The apparatus of claim 9 wherein said switch means comprises means for adjusting a selected characteristic of the selected signal.

\* \* \* \* \*